2,846,398

ANTISEPTIC DETERGENT COMPOSITION

David J. Beaver, Richmond Heights, and Paul J. Stoffel, St. Louis, Mo., assignors to Monsanto Chemical Company, St. Louis, Mo., a corporation of Delaware No Drawing. Application December 27, 1955
Serial No. 555,301

11 Claims. (Cl. 252—106)

This invention relates to certain new polyhalogen substituted carbanilides and to novel cosmetic compositions comprising such polyhalogen substituted carbanilides exhibiting antiseptic properties. According to a particular embodiment this invention relates to antiseptic compositions having an organic anionic surface-active detergent base or an organic non-ionic surface-active detergent base or combination thereof containing certain new polyhalogen substituted carbanilides. In particular this invention relates to controlling the growth of Micrococcus pyogenes var. aureus on surfaces containing same.

In accordance with one aspect of this invention it has been found that cosmetic compositions ordinarily used in beautifying, cleansing or protecting the skin, such as the organic cleansing detergents (i. e. the anionic and non-ionic surface-active detergents and mixtures thereof), shaving creams, shaving soaps, shampoos, toothpastes, astringent preparations, ointments, facial creams, and the like, are rendered highly antiseptic by incorporating therein a polyhalogen substituted carbanilide of the structure

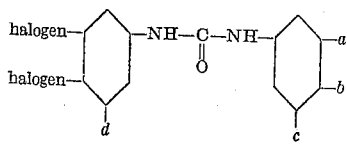

wherein $a$, $b$, $c$ and $d$ are hydrogen or halogen and wherein at least one of the atoms $a$, $b$ and $c$ is a halogen atom. By the term "halogen" as used in the instant specification and appended claims is meant chlorine and bromine, but preferably chlorine. Of these polyhalogen substituted carbanilides 3,3',4'-trichloro-carbanilide and 3,4,4'-trichloro-carbanilide have been found to be particularly outstanding as antiseptic agents in cleansing compositions having as a base an anionic or non-ionic organic surface-active detergent or a mixture thereof. As illustrative of other polyhalogen substituted carbanilides of this invention are 3,3',4-tribromo-carbanilide
3,4,4'-tribromo-carbanilide
3'-bromo-3,4-dichloro-carbanilide
3,4-dibromo-3'-chloro-carbanilide
3,4-dibromo-4'-chloro-carbanilide
3,3',4',5'-tetrachloro-carbanilide
3,4,3',4'-tetrachloro-carbanilide
3,4,3',4'-tetrabromo-carbanilide
3,4-dibromo-3',4'-dichloro-carbanilide
3,4,3',5'-tetrachloro-carbanilide
3,4,3',4',5'-pentachloro-carbanilide
3,4,5,3',4',5'-hexachloro-carbanilide As illustrative of the preparation of the polyhalogen substituted carbanilides of this invention is the following:

*Example I*

To a suitable reaction vessel equipped with a thermometer, agitator and reflux condenser and containing 8.1 parts by weight (substantially 0.05 mol) of 3,4-dichloroaniline in approximately 57 parts by weight of diethyl ether is added dropwise a solution of 7.7 parts by weight (substantially 0.05 mol) of 4-chlorophenyl isocyanate in approximately 15 parts by weight of diethyl ether at such a rate so as to maintain gentle reflux. Upon completion of the isocyanate addition the reaction mass is agitated for about one hour. The mass is filtered and the residue washed with diethyl ether. The dried product is a white fluffy solid which on recrystallization from ethanol gives fine white plates of 4,3',4'-trichloro-carbanilide, M. P. 255.2–256.0° C.

Employing the above procedure but replacing 3,4-dichloroaniline with an equimolecular weight of 3,4-dibromoaniline, 4-chloro-3',4'-dibromo-carbanilide is obtained.

*Example II*

To a suitable reaction vessel is added and intimately mixed for about one hour at room temperature 8.1 parts by weight of 3,4-dichloroaniline, approximately 72 parts by weight of diethyl ether, and approximately 7.7 parts by weight of 3-chlorophenyl isocyanate. The mass is filtered and the residue washed with diethyl ether. The dried product is a white solid which on recrystallization from ethanol gives white needles of 3,3',4'-trichloro-carbanilide, M. P. 210.7–211.3° C.

Employing the procedure of Example II but replacing 3,4-dichloroaniline with an equimolecular weight of 3,4-dibromoaniline, 3,4-dibromo-3'-chloro-carbanilide (M. P. 208.5–209.0° C.) is obtained as a white flaky solid.

Employing the procedure of Example II but replacing 3-chlorophenyl isocyanate with an equimolecular weight of 3-bromophenyl isocyanate, 3'-bromo-3,4-dichloro-carbanilide (M. P. 208.5–209.2° C.) is obtained in the form of white plates.

Employing the procedure of Example II but replacing 3,4-dichloroaniline adn 3-chlorophenyl iso-cyanate, respectively, with equimolecular weights of 3,4-dibromoaniline and 3-bromophenyl isocyanate, there is obtained 3,3',4-tribromocarbanilide.

*Example III*

To a suitable reaction vessel is added and intimately mixed for about one hour at room temperature 4.3 parts by weight of 3,4-dichloroaniline, approximately 72 parts by weight of diethyl ether, and approximately 5.0 parts by weight of 3,4-dichlorophenyl isocyanate. The mass is filtered and the residue washed with diethyl ether. The dried product is a white solid which on recrystallization from ethanol gives white granules of 3,4,3',4'-tetrachloro-carbanilide, M. P. 281–282° C.

Employing the procedure of Example III but replacing 3,4-dichloroaniline and 3,4-dichlorophenyl isocyanate, respectively, with equimolecular weights of 3,4-dibromoaniline and 3,4-dibromophenyl isocyanate, there is obtained 3,3',4,4'-tetrabromocarbanilide.

*Example IV*

To a suitable reaction vessel is added and intimately mixed for about two hours at 35° C. 5.3 parts by weight of 3,4,5-trichloroaniline, approximately 72 parts by weight of diethyl ether, and approximately 5.0 parts by weight of 3,4-dichlorophenyl isocyanate. The mass is filtered and the residue washed with diethyl ether. The dried product is a white solid which on recrystallization from ethanol gives white needles of 3,4,5,3',4'-pentachloro-carbanilide, M. P. 308–309° C.

Employing the procedure of Example IV but replacing 3,4-dichlorophenyl isocyanate with an equimolecular weight of 3,4,5-trichlorophenyl isocyanate, there is obtained 3,4,5,3',4',5'-hexachloro-carbanilide.

In the preparation of the new compounds of this invention other inert solvents than diethyl ether may be employed, e. g. di-isopropyl ether, methylbutyl ether, the liquid alkanes and the like. The reaction temperature employed in preparing the new compounds will depend upon the particular reactants and in general will be between room temperature and the reflux temperature of the system.

According to one aspect of this invention, cosmetic compositions, such as organic cleansing detergents, shaving creams, shaving soaps, shampoos, etc., having an organic anionic surface-active detergent base (or mixture of such organic anionic compounds as the detergent base) or organic non-ionic surface-active detergent base (or mixture of such non-ionic compounds as the detergent base) or combination of an anionic and non-ionic organic surface-active agents as the detergent base, are rendered highly antiseptic by incorporating therein the aforedescribed polyhalogen substituted carbanilides. While organic detergents (i. e. the anionic and non-ionic surface-active detergents characterized by having a molecule which carries a hydrophobic tail and a hydrophilic head, wherein the hydrophilic head points toward water while the hydrophobic tail points away from water) are capable of washing large quantities of bacteria and other micro-organisms off surfaces, relatively appreciable numbers of such organisms remain on the surface which continue to multiply. In order to remove this residue it has usually been necessary to use a separate treatment with some disinfectant agent. A combined single step procedure would be most desirable. However, the problem is not simple to solve on a commercial scale in an economical manner inasmuch as the organic detergents destroy the bactericidal efficacy of nearly all disinfectants. In order to be of universal application the bacteriostat must not lose its activity in the presence of the organic detergent, it should be active at low concentrations, it should be non-toxic to animals, non-irritating to the skin, and have some affinity for the skin so that after rinsing a small amount will remain and exert a bacteriostatic effect. The polyhalogen substituted carbanilides of this invention, especially 3,3',4-trichloro- and 3,4,4'-trichloro-carbanilides, when admixed with an organic detergent, such as an anionic surface-active detergent or non-ionic surface-active detergent or combination thereof, satisfy all of these requirements, and furthermore, do not discolor the organic detergent nor impart an undesirable odor thereto.

In order to illustrate the preferred embodiment of this invention several of the polyhalogen substituted carbanilides of this invention were incorporated in an alkali metal fatty acid soap, specifically an "Ivory" brand neutral high grade white toilet soap [a mixture of alkali metal salts of fatty acids whose fatty acid content analyzes

| | |
|---|---|
| Oleic and linoleic acid | About 46% |
| Stearic acid | About 14% |
| Palmitic acid | About 30% |
| Lower fatty acids (myristic, lauric, etc) | About 10%] | and contrasted to position isomers or analogues thereof. The respective compounds which are tabulated below were incorporated in the said "Ivory" brand toilet soap in a weight ratio of one part to 50 parts soap. Aliquots of each were added to a nutrient agar medium so as to give concentrations in parts per million as set forth below of the respective compounds in the agar. The agar in each case was then poured into a Petri dish, allowed to harden and then inoculated with a standard culture of *Micrococcus pyogenes* var. *aureus* of standard resistance. The incubation in each instance was made at 37° C. for 48 hours. The extent of growth is noted below:

| Compound/Concentration, p. p. m. | 10 | 1 | 0.1 | 0.033 |
|---|---|---|---|---|
| 4,4'-dichloro-carbanilide | heavy | heavy | heavy | (1) |
| 2,4,4'-trichloro-carbanilide | do | do | do | (1) |
| 2,5,4'-trichloro-carbanilide | do | do | do | (1) |
| 3,4,2'-trichloro-carbanilide | do | do | do | (1) |
| 3,4,3'-trichloro-carbanilide | none | none | none | none. |
| 3,4,4'-trichloro-carbanilide | do | do | do | Do. |
| 3,4-dichloro-3'-bromo-carbanilide | do | do | do | (1) |
| 3,4-dibromo-3'-chloro-carbanilide | do | do | do | (1) |
| 2,4,2',4'-tetrachloro-carbanilide | heavy | heavy | heavy | (1) |
| 3,4,2',4'-tetrachloro-carbanilide | do | do | do | (1) |
| 3,4,2',5'-tetrachloro-carbanilide | do | do | do | (1) |
| 3,4,3',4'-tetrachloro-carbanilide | none | none | none | (1) |
| 3,4,3',4',5'-pentachloro-carbanilide | do | do | do | (1) |

1 Not tested.

Replacing the foregoing "Ivory" brand soap with an equal weight of a "Lux" brand solid neutral white toilet soap (a mixture of alkali metal salts of fatty acids whose fatty acid content analyzes about 45% oleic and linoleic acid, about 30% palmitic acid, about 10% stearic acid, and about 15% lower fatty acids) the same results are obtained. The same results are also obtained using instead of a solid soap a liquid soap, such as that having a 40% alkali metal fatty acid soap content prepared from an alkali metal compound and a mixture of fatty acids obtained from a mixture of 75% cocoanut oil and 25% olive oil. Other alkali metal fatty acid soaps may also be used, e. g. the usual alkali metal (sodium and/or potassium) soaps of higher fatty acids of vegetable or animal origin, such as stearic, lauric, palmitic, oleic, linoleic, ricinoleic, and the like, or mixtures thereof obtained from tallow, lard, cocoanut oil, palm oil, castor oil, olive oil, hydrogenated cottonseed oil, and the like.

The organic anionic detergents of this invention include in addition to the preferred alkali metal fatty acid soaps the well known surface-active alkali metal sulfonates and sulfates, which may be employed as the sole detergent base or in admixture with the alkali metal fatty acid soaps (e. g. one part of the fatty acid soap to 0.5 to 2 parts by weight of the surface-active alkali metal sulfonate or sulfate or mixture thereof) as the detergent base. A preferred group of this class is the long chain alkyl aryl sulfonates, i. e. those wherein the alkyl radical is straight or branched in structure and contains from 8 to 22 carbon atoms, but preferably 10 to 16 carbon atoms, examples of which being octyl, decyl, dodecyl, keryl, pentadecyl, hexadecyl, octadecyl, mixed long chain alkyls derived from long chain fatty materials such as the lauryl radical, cracked paraffin wax olefins, polymers of lower mono-olefins such as propylene tetramer and the like, and wherein the aryl radical is derived from benzene, toluene, xylene, phenol, the cresols, naphthalene, and the like. Specific examples of such comprise sodium decyl benzene sulfonate, sodium dodecyl benzene sulfonate, sodium lauryl benzene sulfonate and sodium hexadecyl benzene sulfonate.

Other sulfonate surface-active agents are contemplated also, e. g. the long chain alkyl sulfonates such as sodium hexadecane sulfonate and sodium octadecane sulfonate.

The well known sulfate detergents having 12 to 26 carbon atoms and particularly those having an acyl radical of about 8 to 22 carbon atoms may be employed as anionic detergent bases in accordance with this invention. Such detergents include the sulfuric acid esters of polyhydric alcohols incompletely esterified with fatty acids, e. g. sodium cocoanut oil monoglyceride monosulfate, sodium tallow diglyceride monosulfate, the pure and mixed higher alkyl sulfates such as sodium lauryl sulfate and sodium cetyl sulfate.

Additional anionic surface-active sulfonates and sulfates contemplated by this invention are the sulfated and sulfonated alkyl acid amides such as Igepon T $(C_{17}H_{33}CO.NHCH_2CH_2SO_3Na)$ the sulfated and sulfonated esters such as Igepon AP  ($RCOOCH_2SO_3Na$ where R is an alkyl radical containing from 12 to 18 carbon atoms), sodium salt of the bisulfate of a dialkyl dicarboxylate, sodium salt of the sulfonic acid derivative of a dialkyl dicarboxylate, sodium sulfosuccinic esters such as $$NaOOCCH_2CH(SO_3Na)CONHC_{18}H_{37}$$

and the like. To illustrate the acivity of the polyhalogen substituted carbanilides of this invention when admixed with these anionic detergents is the following:

A. 10 parts by weight of a sodium alkyl benzene sulfonate surface-active agent containing the alkyl radical an average of about 12 carbon atoms is dissolved in 190 parts by weight of water and thereto is added an alcohol solution containing 0.1 part by weight of 3,4,4'-trichloro-carbanilide and 10 parts ethanol.

B. 10 parts by weight of a sodium alkyl benzene sulfonate surface-active agent containing in the alkyl radical an average of about 10 carbon atoms is dissolved in 190 parts by weight of water and thereto is added an alcohol solution containing 0.1 part by weight of 3,4,4'-trichloro-carbanilide and 10 parts ethanol.

Aliquots of the respective compositions A and B were added to a nutrient agar medium so as to give a concentration of 1, 0.5 and 0.10 p. p. m. of 3,4,4'-trichloro-carbanilide. The agar in each case was then poured into a Petri dish, allowed to harden and then inoculated with a standard culture of *Micrococcus pyogenes* var. *aureus* of standard resistance. The incubation in each instance was made at 37° C. for 48 hours and the extent of growth is noted below:

| Composition/Concentration of 3,4,4'-trichloro-carbanilide | 1 p. p. m. | 0.5 p. p. m. | 0.10 p. p. m. |
|---|---|---|---|
| A | none | none | none. |
| B | do | do | Do. |

In addition to the anionic surface-active agents the non-ionic surface-active agents containing a polyhalogen substituted carbanilide of this invention provides antiseptic compositions. The non-ionic surface-active agents contemplated are viscous liquid to wax-like water-soluble surface-active substances containing a polyglycol ether group of the structure

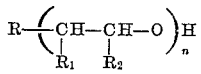

wherein $R_1$ and $R_2$ are hydrogen or short chain alkyl, where $n$ is an integer greater than 3, and where R is a residue of a compound of a monomeric organic compound having an active hydrogen, e. g. alcohols, phenols, amides, primary amines, secondary amines, carboxylic acids, etc. These non-ionic detergents are well known (note U. S. 1,970,578 and U. S. 2,213,477) and may be typified by the polyalkylene oxide derivatives (i. e. polyethylene oxide, polypropylene oxide, polybutylene oxide) of water-insoluble higher fatty acids, such as lauric, oleic, palmitic and stearic acid and the like of mixtures thereof, such as the mixtures of fatty acids obtained from animal and vegetable fats and oils or by oxidation of petroleum fractions such as paraffin wax. They may also be exemplified by the polyalkylene oxide derivatives of such water-insoluble organic hydroxy compounds as higher aliphatic alcohols (i. e. the alcohols corresponding to the fatty acids specified above or mixtures thereof), oil or phenols, particularly alkyl phenols containing at least six alkyl carbon atoms such as isooctyl-, di-tertiary butyl-, triisopropyl-, nonyl-, dodecyl-, octadecyl- phenols or naphthols, or of higher alkyl alcohols, such as benzyl alcohol, cinnamyl alcohol. They may also be exemplified by the polyalkylene oxide derivatives of such amines as stearyl, lauryl, dicyclohexyl, dibutyl amine and the like. A particularly useful non-ionic detergent is that obtained by condensing one mol of tall oil with 5 to 15 mols of ethylene oxide.

To illustrate the activity of a polyhalogen substituted carbanilide of this invention in a non-ionic detergent composition 5 parts by weight of the condensation product of 10 to 12 mols of ethylene oxide with one mol of tall oil was dissolved in 95 parts by weight of water and thereto was added 0.05 part by weight of 3,4,4'-trichloro-carbanilide. An aliquot thereof was added to a nutrient agar medium so as to give a concentration of 1 to 0.1 p. p m. of 3,4,4'-trichloro-carbanilide. The agar in each case was then poured into a Petri dish, allowed to harden and then inoculated with a standard culture of *Micrococcus pyogenes* var. *aureus* of standard resistance. The incubation in each instance was made at 37° C. for 48 hours. No growth of said *Micrococcus pyogenes* var. *aureus* at these concentrations was observed.

The polyhalogen substituted carbanilides are useful in preparing antiseptic shampoos and as illustrative thereof is the following composition:

| | Parts by weight |
|---|---|
| Triethanol lauryl sulfate | 60 |
| Methyl cellulose | 2 |
| Propylene glycol | 4 |
| Potassium stearate | 6 |
| Water | 130 |
| 3,4,4'-trichloro-carbanilide | 1 |

Other organic base detergent compositions for cleansing purposes containing mixtures of detergents which display outstanding antiseptic properties may be exemplified by the following:

| | Parts by weight |
|---|---|
| Tall oil-ethylene oxide condensation product (1 mol tall oil—11 mols ethylene oxide) | 20 |
| Sodium dodecyl benzene sulfonate | 80 |
| Carboxy methyl cellulose, sodium | 4 |
| Sodium tripolyphosphate | 80 |
| Sodium sulfate | 200 |
| 3,4,4'-trichloro-carbanilide | 1 |

The new polyhalogen substituted carbanilides are useful in astringent preparations such as those containing aluminum chloride as the base. An example of such is

| | Parts by weight |
|---|---|
| Aluminum chloride | 20 |
| 3,4,4'-trichloro-carbanilide | 10 |
| Water | 70 |

The polyhalogen substituted carbanilides of this invention may be employed in cosmetic compositions ordinarily used to beautify, cleanse or protect the skin in any amount sufficient to control the growth of or to kill bacteria, specifically *Micrococcus pyogenes* var. *aureus*, normally present on the skin. Relatively small amounts of the polyhalogen substituted carbanilides of this invention in cosmetics, particularly those having as a base an anionic or non-ionic organic detergent base composition or combination of said detergents, have been found to yield effective antiseptic compositions. With respect to cosmetics having an anionic or non-ionic detergent base amounts as low as 0.1% to 1% by weight based upon the total weight of the organic detergent may be employed. It is preferred in detergent cleansing compositions having an anionic detergent base or non-ionic detergent base to employ these polyhalogen substituted carbanilides in amounts in the order of 1% to 3% by weight based on the total weight of detergent. While larger amounts with respect to the detergent base may be employed, the upper limit will be determined by practical considerations as well as by the particular cosmetic composition involved, i. e. whether the composition is to be used for cleansing purposes in the sense of a toilet soap or as a shaving cream or as a shampoo, etc. In cleansing compositions in the sense of a toilet soap containing an anionic organic detergent base (e. g. an alkali metal fatty acid detergent soap alone or in admixture with another anionic organic detergent such as the aforedescribed sodium alkyl aryl sulfonate detergents) or non-ionic detergent base, the amount of polyhalogen substituted carbanilide of this invention ordinarily will not exceed 10% by weight of the detergent base. However, in shampoos, shaving creams, and the like, employing an anionic detergent organic base or non-ionic detergent base the amounts of polyhalogen substituted carbanilide of this invention may be present to the extent of 50% by weight based on the total detergent base content. Various colors, antioxidants, perfumes, water-softeners, salts such as silicates, chlorides, carbonates, phosphates and sulfates of alkali metals and like builders, sodium carboxy methyl cellulose, the low molecular weight alcohols such as methanol, ethanol, isopropanol, ethylene glycol, and the like, may be included where desirable.

While this invention has been described with respect to certain embodiments it is to be understood that it is not so limited in that variations and modifications thereof obvious to those skilled in the art may be made without departing from the spirit or scope of this invention.

This application is a continuation-in-part of application Serial Number 423,821, filed April 16, 1954.

What is claimed is:

1. A cleansing composition comprising a surface-active detergent base selected from the group consisting of anionic and non-ionic organic surface-active detergents and mixtures thereof and an antiseptic amount of a polyhalogen substituted carbanilide of the structure

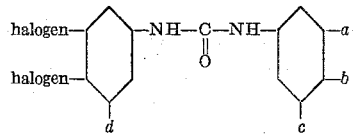

wherein a, b, c and d are selected from the group consisting of hydrogen and halogen and wherein at least one of the atoms a, b and c is halogen, the halogen substituents of the said carbanilide being selected from the group consisting of chlorine and bromine.

2. A composition useful for cleansing comprising a surface-active detergent base and an antiseptic amount in the range of 0.1% to 50% by weight based on the said surface-active detergent base of a polyhalogen substituted carbanilide of the structure

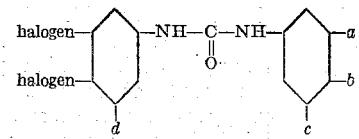

wherein a, b, c and d are selected from the group consisting of hydrogen and halogen and wherein at least one of the atoms a, b and c is halogen, the halogen substituents of the said carbanilide being selected from the group consisting of chlorine and bromine, the said detergent base being selected from the group consisting of anionic and non-ionic organic surface-active detergents and mixtures thereof.

3. An antiseptic composition for cleansing purposes comprising an alkali metal fatty acid detergent soap and 0.1% to 10% by weight based on the said soap of a trichlorocarbanilide having the structure

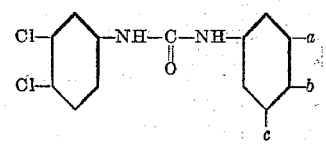

wherein the mono-valent atoms a, b and c total two hydrogen and one chlorine.

4. An antiseptic detergent composition for cleansing purposes comprising an alkali metal fatty acid detergent soap and 1% to 3% by weight based on the said soap of 3,3',4-trichloro-carbanilide.

5. An antiseptic detergent composition for cleansing purposes comprising an alkali metal fatty acid detergent soap and 1% to 3% by weight based on the said soap of 3,4,4'-trichloro-carbanilide.

6. An antiseptic detergent composition comprising an alkali metal alkyl aryl sulfonate detergent and a 0.1% to 10% by weight based on the said detergent of a trichlorocarbanilide having the structure

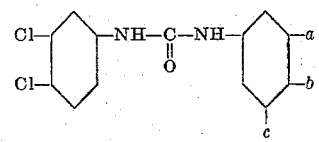

wherein the mono-valent atoms a, b and c total two hydrogen and one chlorine.

7. An antiseptic detergent composition comprising sodium dodecyl benzene sulfonate and 1% to 3% by weight based on the said sulfonate of 3,4,4'-trichlorocarbanilide.

8. An antiseptic detergent composition comprising sodium decyl benzene sulfonate and 1% to 3% by weight based on the said sulfonate of 3,4,4'-trichloro-carbanilide.

9. An antiseptic detergent composition comprising a non-ionic organic surface-active detergent having a polyglycol ether group and 0.1% to 10% by weight based on the said detergent of a trichloro-carbanilide having the structure

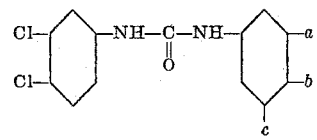

wherein the mono-valet atoms a, b and c total two hydrogen and one chlorine.

10. An antiseptic detergent composition comprising the condensation product of 10 to 12 mols of ethylene oxide with one mol of tall oil and 1% to 3% by weight based on the said detergent of 3,4,4'-trichloro-carbanilide.

11. The method of controlling the growth of *Micrococcus pyogenes* var. *aureus* on a surface which comprises applying to the surface the composition of claim 1.

References Cited in the file of this patent

UNITED STATES PATENTS

| 2,046,375 | Goldstein et al. | July 7, 1936 |
| 2,535,077 | Kunz et al. | Dec. 26, 1950 |
| 2,745,874 | Schetty et al. | May 15, 1956 |
| 2,749,314 | Beaver et al. | June 5, 1956 |

OTHER REFERENCES

Raiford et al.: Jour. Amer. Chem. Soc. 56, 680–1 (1934).